March 1, 1960 W. R. SMITH-VANIZ, JR 2,927,279

VARIABLE FREQUENCY OSCILLATOR SYSTEM

Filed June 14, 1954 2 Sheets-Sheet 1

INVENTOR
WILLIAM R. SMITH VANIZ, JR.
BY
Curtis Morris & Safford
ATTORNEYS

March 1, 1960 W. R. SMITH-VANIZ, JR 2,927,279

VARIABLE FREQUENCY OSCILLATOR SYSTEM

Filed June 14, 1954 2 Sheets-Sheet 2

INVENTOR
WILLIAM R SMITH VANIZ, JR.
BY
Curtis Morris & Safford.
ATTORNEYS

United States Patent Office 2,927,279

Patented Mar. 1, 1960

2,927,279

VARIABLE FREQUENCY OSCILLATOR SYSTEM

William R. Smith-Vaniz, Jr., Stamford, Conn., assignor to C. G. S. Laboratories, Inc., Stamford, Conn., a corporation of Connecticut Application June 14, 1954, Serial No. 436,403

16 Claims. (Cl. 331—4)

This invention relates to variable-frequency oscillators and more particularly to stabilized sweep-frequency oscillators having a wide range of operation.

Variable-frequency oscillators have, in general, proven to be relatively unstable. That is, fluctuations in environmental conditions such as temperature, humidity, shock and vibration, as well as the ageing of parts such as vacuum tubes, often cause undesired changes in output frequency. This characteristic represents a problem in many commercial applications, and an even more serious problem in certain military applications where stable operation must be maintained under adverse operating conditions.

Oscillators can be made to operate over a wide range of output frequencies without mechanically moving parts, such as coil switches, etc., by the use of electrically controllable inductors. For example, such devices may employ cores of ferromagnetic ceramic material, such as is disclosed by Dewitz in U.S. patent application Serial No. 213,548, filed March 2, 1951. However, such ferrite core material is subject to considerable variation of permeability with temperature, and in addition exhibits a marked hysteresis effect. Due to the hysteresis characteristic, the inductance value is a function of the prior magnetic condition of the core, and hence the same control current will not always produce the same output frequency.

The present invention represents a unique solution to these problems and provides a system for controlling and stabilizing the output frequency of a variable-frequency oscillator in such a way as to minimize the effects of fluctuations in environmental conditions, tube ageing, etc. The described arrangement substantially eliminates the effects of core hysteresis.

The various objects, aspects and advantages of this invention will be in part pointed out in and in part apparent from the following description of a sweep generator embodying the invention considered in conjunction with the accompanying drawings, in which:

Figure 1 shows a block diagram of the major components of the sweep generator system; and Figure 2 is a schematic diagram of the electronic circuits.

The over-all operation of the system will be explained in connection with Figure 1 and the detailed circuits suitable to perform the various functions will be explained later in connection with Figure 2.

The apparatus of Figure 1 is designed to produce an alternating current signal that sweeps rapidly and repeatedly over a wide range of frequencies. In the system to be described, these variable frequency signals are produced without moving parts and the rate of frequency sweep and the amplitude are maintained constant.

The variable frequency signals are produced by a sweep oscillator 1 which is controlled by a D.-C. sweep voltage produced by a saw-tooth pulse generator 2. The saw-tooth pulse generator 2 delivers a series of saw-tooth pulses which are fed into a comparison amplifier 3. This comparison amplifier 3 is provided also with another control voltage from a discriminator 4 which is arranged to deliver a D.-C. voltage that is proportional to the frequency of the signal being generated by the oscillator 1. The two control voltages, that is, the one from the discriminator 4 and the one from the pulse generator 2, are amplified and the magnitudes of the two voltages compared in the comparison amplifier 3. A signal proportional to the difference between these two control signals is applied to a control circuit of the sweep oscillator 1 to control the frequency generated by the sweep oscillator. It will be understood that when the voltage delivered by the discriminator 4 is equal to the voltage being delivered by the pulse generator 2, no control or correction voltage will be applied to the sweep oscillator 1. However, as the voltage delivered by the pulse generator 2 changes, then a control voltage will be applied to the sweep oscillator which will cause the frequency generated by the sweep oscillator to change in such direction as to cause the voltage developed by the discriminator 4 to be equal to the new value of voltage from the generator 2.

From the foregoing, it will be seen that if the pulse generator 2 is arranged to provide a D.-C. saw-tooth voltage, the sweep oscillator 1 will be caused to sweep at a constant frequency rate over a range of frequencies and then return quickly to again sweep the same frequency range. A limiter shaper circuit 5 is provided between the sweep oscillator 1 and a discriminator 4 in order to prevent changes in the amplitude of the signals generated by the sweep oscillator 1 from causing a change in the voltage delivered by the discriminator 4. In addition, an amplitude-regulating circuit 6 is provided to further minimize variations in the voltage of the signal developed by the sweep oscillator 1.

The foregoing sets forth the general operation of the system in terms of the broad functions performed by the major portions of the apparatus, but additional functions are provided by the detailed apparatus with resulting advantages in practical operation.

*Detailed description and operation of saw tooth pulse generator 2*

Figure 1:
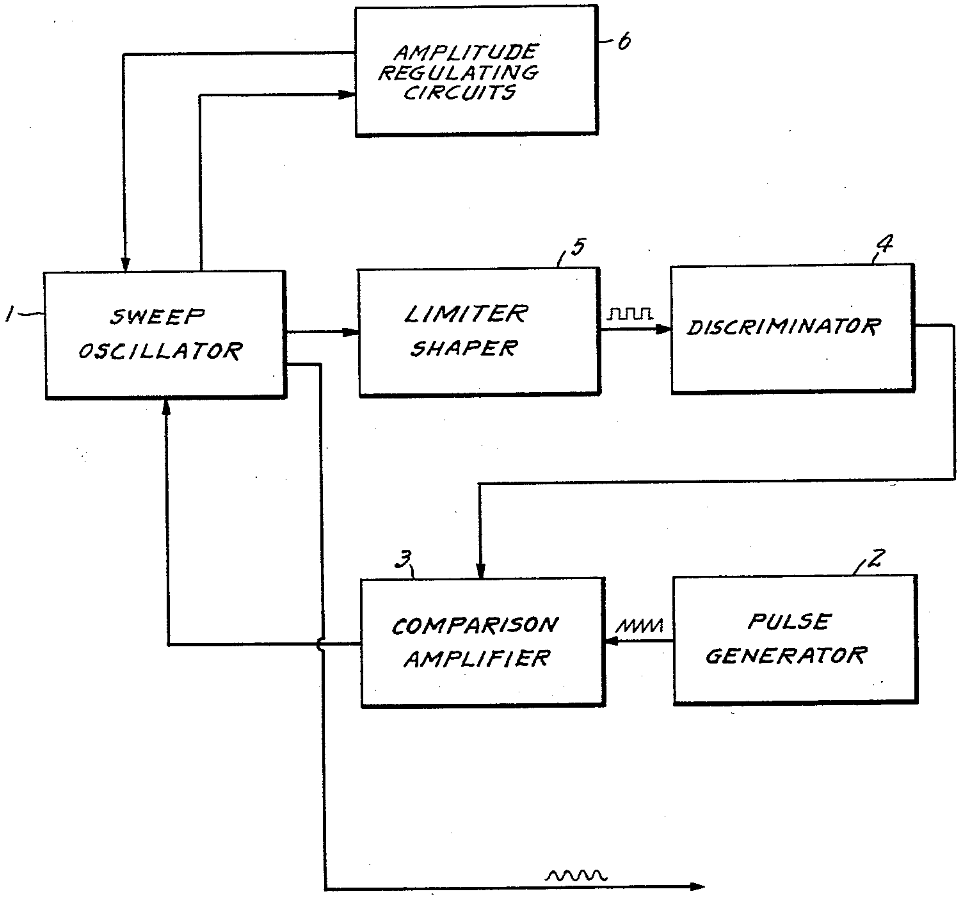
Figure 2:
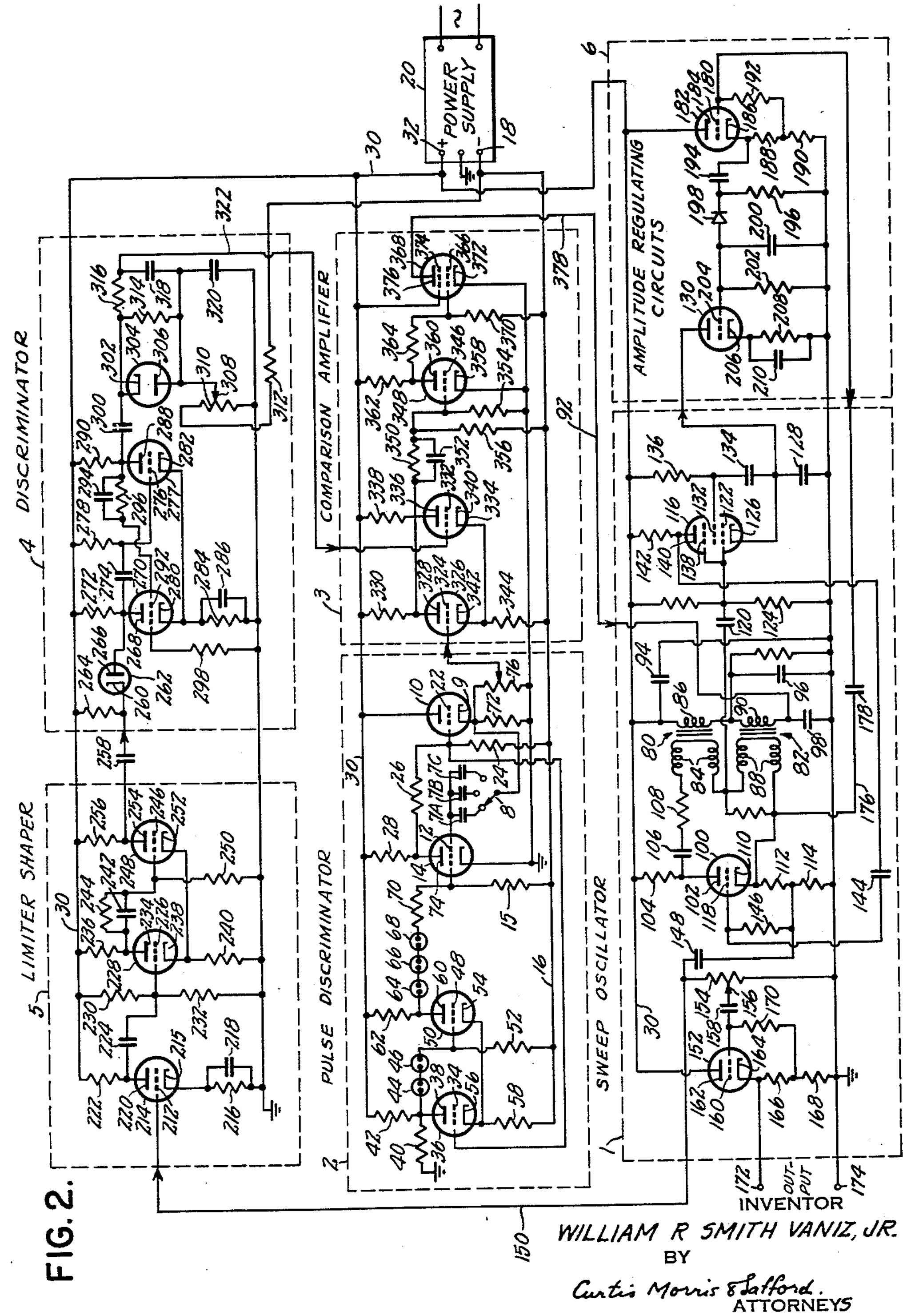

The linear sweep saw tooth pulse generator 2 is arranged to provide variable sweep rates but the "fly-back" time is maintained as a fixed percentage of the sweep time. The saw-tooth pulse-generator circuits are shown in more detail in Figure 2 enclosed within the broken lines 2. The sweep time is controlled by three capacitors 7A, 7B, and 7C which can be selected by a switch 8 and connected to a cathode 9 of a vacuum tube 10, which is connected as a cathode-follower. The other electrodes of the capacitors 7A, 7B and 7C are connected to a control grid 12 of a vacuum tube 14 and through a resistor 15 to a lead 16 which is maintained at a negative potential relative to the common ground circuit. The lead 16 is connected to a terminal 18 of a conventional regulated power supply 20 connected to the usual power mains.

The control grid 22 of the vacuum tube 10 is connected through a resistor 24 to the lead 16 and through a resistor 26 and a plate load resistor 28 to a positive voltage supply lead 30 which is connected to an output terminal 32 of the power supply 20. The voltage on the grid 22 is ordinarily negative relative to the cathode 9, but varies in magnitude as a function of the current passing through the tube 14.

The grid 22 is connected also to the control grid 34 of a vacuum tube 36. The anode 38 of this tube is connected to the common ground circuit through a resistor 40, to the positive voltage supply lead 30 through a plate load resistor 42, and through two series-connected neon gas tubes 44 and 46 to a control grid 48 of a vacuum tube 50. The neon-filled lamps provide a constant potential drop when they are conducting, as is well-known. The control grid 48 is connected also to the negative supply lead 16 through an isolation resistor 52 to provide current flow through the neon tubes.

The cathode 54 of the tube 50 is connected to the cathode 56 of the tube 36, and through a bias resistor 58 to the negative lead 16. The anode 60 of the tube 50 is connected through a load resistor 62 to the supply lead 30 and through three series-connected neon gas tubes 64, 66, and 68 and a current-limiting resistor 70 to the control grid 12 of the tube 14.

This sweep saw tooth generator circuit 2 operates generally as follows: Assume, as an initial condition, that the tubes 10 and 36 are non-conducting, that is, no significant amount of plate current is flowing in these tubes, and the output voltage across the cathode load resistor 72 is low. Thus, the potential of the anode 38 of tube 36 is high, and consequently the neon gas tubes 44 and 46 are in conduction. Accordingly, the potential on the grid 48 is at a high value, and the tube 50 is fully conducting, thus preventing the neon tubes 64, 66, and 68 from igniting. This is the beginning of the upward sweep in the output voltage across an output potentiometer 76. At this time, the condenser 7A begins to be charged through the resistors 15 and 72, and the potential on the grid 12 begins to move down toward the voltage of the lead 16, thus progressively decreasing the current through the tube 14. The anode 74 of the tube 14, therefore, is at an increasingly high positive potential and drives the grid 22 of the tube 10 in a positive direction because of the common connection through the resistor 26. This causes the tube 10 to conduct increasing amounts of current and produces an increasing output voltage across the cathode resistor 72, and also across the output potentiometer 76. The voltage on the cathode 9 is fed back also to the capacitor 7A in order to improve the linearity of the sweep signal.

The potential of the control grid 34 of the tube 36 rises along with that of the control grid 22 and causes the tube 36 to conduct increasing amounts of plate current. When this occurs, the voltage of the anode 38 and the voltage on the control grid 48 of tube 50 progressively drop, thereby progressively decreasing the current flow through the tube 50. The neon tubes 44 and 46 had previously been ignited but are extinguished by the drop in the voltage at the anode 38. The common cathode bias resistor 58 of the tubes 36 and 50 causes the anode current of the tube 50 to be cut-off almost instantaneously. Therefore, a voltage on the anode 60 rises rapidly, and to a value sufficiently high to initiate conduction of the neon tubes 64, 66, and 68.

This produces another charging path for the condenser 7A, but of the opposite polarity, causing the condenser 7A to discharge and reverse its potential by current flow through resistors 62 and 70. This drives the potential of the grid 12 in a positive direction and decreases the potential of the anode 74 and the grid 22, and hence the output voltage on the potentiometer 76 also decreases. This continues until the voltage of the control grids 22 and 34 is lowered to the point where the tube 36 ceases to conduct, which in turn switches tube 50 back into conduction, and the cycle is ready to repeat again.

The sweep rate is a function of the charging rate of the capacitor 7A, which in turn is a function of the magnitude of the capacitance and the value of the resistor 15. (Resistor 72 is also in the charging circuit, but is chosen to have a value much smaller than resistor 15 and hence will have negligible effect.) The discharge rate, or fly-back time, is correspondingly a function of the capacitance of the capacitor 7A and the value of the resistance 70 (resistors 72 and 62 are small in comparison with resistor 70). The ratio of sweep time to fly-back time is accordingly constant, irrespective of which capictor 7A, 7B, or 7C is switched into the circuit.

*Detailed description and operation of sweep frequency oscillator 1*

As described above, these saw-tooth pulses are utilized to control an amplitude-stabilized, variable-frequency oscillator indicated within the broken lines 1. The frequency of the signal generated by the oscillator 1 is controlled by a pair of controllable inductors 80 and 82. These inductors may be of the type described in the above-identified application of Gerhard H. Dewitz. Each inductor may include a core of ferromagnetic ceramic material, such as are commonly referred to as ferrites, or it may be made of other suitable core material. The cores may be formed of different materials, one part of which is selected to carry the flux produced by the generated signals and another part of which carries primarily the flux produced by the control signals. The inductor 80 may comprise a ring core having a slot therein through which is wound a signal winding 84, this winding being divided into two equal parts wound through the slot and around opposite portions of the core so that flux generated by this winding traverses the core area around the slot. A control winding 86 may be wound on the same core in the form of a toroid. The current through the control winding 86 controls the extent of magnetic saturation of the core and thereby controls the effective inductance of the signal winding 84.

The controllable inductor 82 may be identical with the inductor 80 and is provided with a signal winding 88 and a control winding 90.

The two control windings 86 and 90 are connected in series. One end of the control winding 86 is connected to the positive voltage supply lead 30 and the other control winding is connected to a lead 92 from the output of the comparison amplifier 3, which will be described in detail later. Each end of the control windings 86 and 90 is by-passed to the common ground circuit, as by capacitors 94, 96 and 98 to prevent any possibility of the oscillator signals feeding into the control circuits.

The oscillations are produced by a tube 100, the anode 102 of which is connected through a load resistor 104 to the positive voltage supply lead 30. The anode 102 is coupled also through a capacitor 106 and a resistor 108 to one end of the signal winding 84. The cathode 110 is connected to one end of the other signal winding 88 and through two series connected resistors 112 and 114 to the common ground circuit.

A positive feed-back circuit, including a pentode tube 116, is connected between the junction of the signal windings 84 and 88 and the control grid 118 of the oscillator tube 100. The junction of the two signal windings is coupled through a capacitor 120 to the control grid 122 of the pentode tube 116, a ground return circuit being completed through a resistor 124 connected between the control grid and the common ground circuit.

The cathode 126 of this tube is by-passed to ground by a capacitor 128 but the direct current path to the common ground circuit is completed through a triode vacuum tube 130. This controllable cathode circuit is provided to stabilize the amplitude of the oscillation signals and will be described in detail later. The screen grid 132 of the tube 116 is by-passed to the cathode circuit through a capacitor 134 and is connected to the positive voltage supply lead 30 through a voltage-dropping resistor 136. The suppressor grid 138 is connected directly to the control grid 122 and the anode 140 is connected through a plate load resistor 142 to the supply lead 30. The signal produced at the anode 140 is coupled through a capacitor 144 to the control grid 118 of the tube 100, grid bias and a direct current return circuit being provided by a resistor 146 connected between the grid 118 and the junction of the cathode resistors 112 and 114.

The current through tube 100 will, therefore, oscillate at the frequency determined by the resonance of the above feed-back circuit, and this in turn is dependent upon the current flowing through the control winding 86, since the permeability of the saturable core determines the inductance of the signal winding 84.

The junction of the resistors 112 and 114 is coupled through a capacitor 148 to an output lead 150 by which the signals are coupled to the limiting and shaping circuits 5 which precede the discriminator circuits 4.

These output signals are coupled also to a cathode-follower output tube 152 through a potentiometer 154 connected between the lead 150 and the common ground circuit, the sliding contact 156 of this potentiometer is coupled through a capacitor 158 to the control grid 160 of the tube 152. The anode 162 of this tube is connected directly to the positive voltage supply lead 30 and its cathode 164 is connected through two series resistors 166 and 168 to the common ground circuit the control grid 160 being returned to the junction of the two resistors through a resistor 170. The output signal is developed across the cathode circuit of this tube and appears between the two output terminals 172 and 174.

*Detailed description and operation of amplitude regulating circuits 6*

In order to provide stabilization of the amplitude of the signal produced by the oscillator circuit, the signal appearing at the cathode 110 of the oscillator tube 100 is used to control the impedance of the tube 130 which is in the cathode circuit of the feed-back tube 116. The signals appearing on the cathode 110 are coupled through a lead 176 and a capacitor 178 to the control grid 180 of a tube 182, connected as a cathode-follower. The anode 184 of this tube is connected to the positive supply lead 30 and its cathode 186 is connected to the common ground circuit through two series-connected load resistors 188 and 190, bias voltage for the control grid 180 being provided through a resistor 192 connected between the grid and the junction of the resistors 188 and 190. The signal appearing at the cathode 186 is coupled through a capacitor 194 to a rectifier-filter circuit including a load resistor 196, a half-wave dry-type rectifier 198 and a parallel-connected filter capacitor 200 and load resistor 202. The direct control voltage thus developed is applied to the control grid 204 of the tube 130. The cathode 26 of this tube is connected to ground through a bias resistor 208 in parallel with a capacitor 210.

The variable load in the cathode circuit of the feed-back tube 116 serves to stabilize the amplitude of oscillations in the following manner: If the amplitude of the oscillations increases, a higher voltage is applied to the grid 180 of tube 182 causing an increase in voltage across the capacitor 200 and driving the voltage on the grid 204 in a negative direction. This causes the effective resistance of the tube 130 to become greater and increases the cathode voltage of the tube 116, thereby decreasing the amplification of this tube. This lowered amplification reduces the energy fed back from the plate circuit to the grid circuit of the oscillator tube 100. With decreased feedback, the amplitude of the oscillations decreases. If the amplitude of the oscillations should decrease, the feedback signal increases thus stabilizing the oscillator output signal.

*Detailed description and operation of limiter shaper circuits 5*

The oscillator signal on the lead 150 is applied to the control grid 212 of an amplifier tube 214 which forms part of the limiter-shaper circuits 5. The cathode 215 of this tube is connected through a bias resistor 216, connected in parallel with a capacitor 218, to the common ground circuit.

The anode 220 of this tube is connected through a load resistor 222 to the positive voltage supply lead 30. The signals developed at the anode are coupled through a capacitor 224 to a control grid 226 of a pulse-forming tube 228.

This grid 226 is biased positively by a voltage-divider network comprising two resistors 230 and 232 connected between the lead 30 and the common ground circuit with their common point connected to the control grid 226. The anode 234 of this tube is connected through a plate load resistor 236 to the positive voltage lead 30 and its cathode 238 is connected to the common ground circuit through the bias resistor 240.

The signals developed at the anode 234 are coupled through a capacitor 242 in parallel with a resistor 244 to a control grid 246 of a second pulse-shaping tube 248, the grid circuit being provided with a D.-C. return through a resistor 250 connected between the control grid 246 and the common ground circuit. The cathode 252 of this tube is connected to the cathode 238 of the tube 228 so that the resistor 240 serves as a common bias resistor for the two tubes. The anode 254 of the tube 248 is connected to the positive voltage supply lead 30 through a load resistor 256 and the signals developed at the anode 254 are coupled through a capacitor 258 to the discriminator circuit 4.

In operation, the tube 214 amplifies the signals received from the oscillator 1. The amplified signals are fed to the tube 228 which is biased positively so that the voltage at the anode assumes the form of a series of pulses. This signal is applied to the tube 248, which also is biased positively so that the shaping operation is continued to produce a series of rectangular pulses at the same recurrent frequency as the oscillations from the oscillator 1. The tube 248 is driven between cut-off and saturation during each cycle of the input signal so that the amplitude of the output pulses is maintained constant irrespective of variations in the amplitude of the input signal from the oscillator 1.

*Detailed description and operation of frequency discriminator circuits 4*

The rectangular pulses from the pulse-shaping circuits 5 are differentiated by a network including the capacitor 258, which is connected between the anode 254 of tube 248 and the cathode 260 of a diode rectifier tube 262, and a resistor 264 which is connected between the cathode 260 and the positive voltage supply lead 30. With this arrangement a sharp spike or pulse is produced at the beginning and end of each of the rectangular waves from the shaping circuits 5.

The anode 266 of the diode 262 is connected directly to the anode 268 of a first tube 270 of a one-shot multivibrator circuit. The anode 268 is coupled through a resistor 272 to the plate supply lead 30. With this arrangement the cathode 260 of the diode tube 262 is biased positively with respect to its anode 266 so that positive pulses at the cathode 260 do not cause any conduction of the diode. However, negative pulses, which correspond in time to the negative going pulses of the rectangular waves, cause the diode 262 to conduct current. The increased current through the resistor 272 causes a drop in the voltage at the anode 268. This drop in voltage at the anode 268 is coupled through a capacitor 274 to a control grid 276 of the second tube 277 of the one-shot multivibrator circuit. This grid 276 is biased positively by means of a resistor 278 connected between the positive supply lead 30 and the grid 276, so that the tube 277 normally conducts full anode current. The cathodes 280 and 282 of the tubes 270 and 277 are connected together and to the common ground circuit through a bias resistor 284 which is connected in parallel with a capacitor 286. The anode 288 of the tube 277 is connected through a plate load resistor 290 to the positive voltage supply lead 30. When the momentary negative voltage which results from the conduction of current through the diode 262 is applied to the grid 276 of the tube 277, the plate current is reduced causing the voltage at the anode 288 to rise. This rise in voltage is transmitted back to the control grid 292 of the tube 270 through a capacitor 294 connected from the anode 288 to the grid 292 and which is in parallel with a resistor 296. This negative pulse causes the tube 270 to stop carrying current until the capacitor 294 has discharged to permit the voltage at the grid to rise to its normal value. A D.-C. return circuit for the grid 292 is provided through a resistor 298 connected between the grid 292 and a common ground circuit.

Thus, each time a negative pulse is applied to the cathode 260 of the diode tube 262, a single pulse is generated by the one-shot multivibrator which includes the tubes 270 and 277 together with the associated circuits. The duration of the pulse generated by the one-shot multivibrator is a function of the time constants of the circuits and the recurrent rate of these pulses depends upon the frequency of the signals delivered by the shaping circuits 5 which in turn corresponds to the frequency of the signal on the lead 150 from the oscillator circuits 1.

The pulses from the one-shot multivibrator are rectified and utilized to produce a direct control voltage whose amplitude is proportional to the frequency of the pulses produced by the multivibrator. The signals from the anode 288 of the tube 277 are coupled through a capacitor 300 to the cathode 302 of a diode tube 304, the anode 306 of which is connected to the slider 308 of a potentiometer 310. One end of this potentiometer is connected to the common ground circuit and the other end is connected through a resistor 312 to the negative terminal 18 of the power supply 20.

With this arrangement, the anode 306 is biased negatively with respect to the common ground circuit by an amount depending upon the slider 308. When the negative voltage applied to the cathode 302 by the pulses from the multivibrator circuit exceeds the negative bias voltage of the anode 306, the diode conducts current and produces a voltage across a load resistor 314 which is connected in parallel with the diode 304. The pulse voltage across the resistor 314 is filtered by means of a resistor 316 and a filter capacitor 318 which are connected in series with each other and in parallel with the resistor 314. A capacitor 320 is connected between the slider 308 of the potentiometer 310 and the common ground circuit. The D.-C. voltage appearing on the lead 322 which is connected to the capacitor 318 is proportional to the frequency of the pulses produced by the multivibrator circuit which in turn corresponds to the frequency of the signals from the oscillator. The discriminator circuits thus provide a voltage which is proportional to the frequency of the oscillator signals over a very wide range of operation. It is apparent that with the ordinary tuned circuit networks, operation over only a limited range of frequencies could be achieved.

*Detailed description and operation of comparison amplifier circuits 3*

The voltage from the discriminator circuit is compared with the voltage from the saw-tooth pulse generator circuits 2 to provide a control signal that is a function of the difference between these two voltages.

The varying voltage from the saw-tooth generator circuits 2 is applied to a control grid 324 of a comparison tube 326, the anode 328 of which is connected through a resistor 330 to the positive voltage supply lead 30. The D.C. control voltage which appears on the lead 322 is applied to a control grid 332 of an isolation tube 334 whose anode 336 is connected through a plate load resistor 338 to the positive voltage supply lead 30. The cathode 340 of this tube is connected directly to the cathode 342 of the comparison tube 326 and to ground through a bias and load resistor 344.

The current through the resistor 344 is a function of the current through the tube 334 which in turn depends upon the magnitude of the control voltage from the discriminator circuits 4. Thus, the variation in voltage at the cathode of the tube 326 depends upon the voltage from the discriminator circuits. Accordingly these two voltages are added together in opposition in the tube 326, so that the potential appearing at the anode 328 is a function of the difference between these two voltages. This voltage is applied to the control grid 346 of a D.-C. amplifier tube 348 through a resistor 350 connected in parallel with a capacitor 352. Bias voltage is provided for the grid 346 by means of a voltage divider comprising two resistors 354 and 356 connected in series between the common ground circuit and the negative voltage supply lead 16, the grid 346 being connected to the junction of these two resistors. The cathode 358 of this tube is connected directly to the common ground circuit and its anode 360 is connected through a plate load resistor 362 to the positive voltage supply lead 30 and also through a resistor 364 to a control grid 366 of a current-control tube 368. The control grid 366 is connected to the negative voltage supply lead 16 through a resistor 370 so as to provide the proper operating bias for the tube 368. The cathode 372 is connected directly to the common ground circuit. The screen 374 is connected directly to the positive voltage supply lead 30 and the anode 376 is connected by a lead 378 to one end of the control winding 90 of the controllable inductor 82 and through the control winding 86 of the controllable inductor 82 to the positive voltage supply lead 30. The magnitude of the current flowing through the tube 368 is thus a direct function of the difference in potential between the control voltage from the discriminator circuits 4 and the varying voltage from the saw-tooth generator 2, so that the control current of the controllable inductors is a function of this difference in voltage.

*Summary of operation of sweep frequency oscillator 1*

The current through the control windings 86 and 90 is in such direction that the frequency generated by the oscillator circuits 1 is shifted in such direction as to minimize the control voltage. Accordingly, when the sweep generator voltage varies in saw-tooth fashion, the frequency of the oscillator is caused to vary in such manner as to produce a corresponding saw-tooth variation in the D.-C. control voltage provided by the discriminator circuits. Accordingly, the oscillator voltage is caused to sweep over a wide range of frequencies and at a substantially uniform rate.

This arrangement also provides increased protection against instability such as would be caused by changes in the ambient conditions. For example, ferrite cores are generally subject to variation caused by changes in temperature. With the present arrangement, any change in frequency which is caused by a change in ambient temperature or other condition causes the frequency of the signal generated by the oscillator circuits 1 to drift, but this incipient deviation is immediately translated into a variation in the output voltage of the discriminator circuits 4. This voltage in turn is compared with the voltage from the sweep generator circuit 2 and the difference voltage applied to the control windings of the controllable inductors so as to reset the resonant circuit of the oscillator circuits to cause the frequency produced by the oscillator to be substantially unaffected by the variation in temperature.

From the foregoing, it will be apparent that the apparatus described is well-adapted for the attainment of the ends and objects set forth above. It will be apparent also that the invention is subject to many modifications and that other circuits performing similar functions can be substituted for the particular circuit arrangement selected for the description in order to set forth the principles of operation. It will be apparent also that the circuits may be simplified or expanded according to the requirements of the particular application to which the invention is to be put. It will be apparent, for example, that it is not necessary for the utilization of the invention to have a sweep oscillator which produces a linear sweep; for some uses a non-linear sweep may be desired and it is within the scope of this invention to provide for non-linear sweep or control characteristics.

Although the entire system uses vacuum tubes of the types readily available in the market, it will be apparent that other types of amplifier tube may be substituted so long as the functions of the over-all components of the system are performed. Moreover other amplifying devices, such as transistors or other semi-conductor devices, may be utilized in the apparatus to replace some or all of the vacuum tubes. Such changes obviously result in substantial changes in the particular circuitry and such modifications of the circuit are contemplated and are within the scope of the invention. It will be apparent also that the present description is for the purpose of demonstrating the principles of the invention and that certain details and requirements of the circuit have been omitted. For example, no heater circuits have been shown in the circuit diagrams, it being apparent that suitable sources of heater voltage must be provided if conventional vacuum tubes are to be used.

I claim:

1. A signal generating system comprising a source of alternating current signals, electrical means for varying the frequency of the signals delivered by the source, discriminator means coupled to said source and arranged to produce a first control direct current whose value at each instant is a function of the frequency of the signal being delivered by said source, a saw-tooth pulse-generator producing a second and separate control direct current having changes in amplitude occurring at frequencies far lower than the lowest frequency of the signals from said source, means for comparing continuously the values of said first and second control currents and producing a third control current whose value is a function of the difference between the values of said first and second currents, and circuit means coupling said third control current to said electrical means, said electrical means being under the control of said third current, whereby the frequency of the signals from said source is varied in accordance with the changes in amplitude of the direct current from said saw-tooth pulse generator.

2. A sweep-signal generating system wherein the frequency from a source of alternating current signals is controlled by a saw-tooth generator comprising a source of alternating current signals, electrical means for varying the frequency of the signals delivered by the source, discriminator means coupled to said source and arranged to produce a first continuous uni-directional control signal whose value is proportional to the frequency of the signal being delivered by said source, a saw-tooth generator producing a second and separate unidirectional saw-tooth control signal whose frequency is far lower than the lowest frequency of said source of alternating current signals, means for comparing simultaneously with respect to each other the instantaneous values of said first and second unidirectional control signals and producing a third control signal whose value is a function of the instantaneous difference between the values of said first and second signals, and circuit means coupling said third control signal to said electrical means, said electrical means being under the control of said third signal, whereby a sweep in frequency occurs during each pulse from the saw-tooth generator.

3. A sweep-frequency signal generating system for cyclically generating sweeps in frequency under the control of a pulse generator comprising a frequency-controllable source of alternating current signals, electrical means for varying the frequency of the signals delivered by the source, discriminator means coupled to said source arranged to produce a first continuous-current control signal whose value continuously varies as a function of the frequency of the signal being delivered by said source, said discriminator means including a one-shot type of pulse device producing a pulse for each cycle of the alternating signal from said source and including a rectifier and filter circuit coupled to the output of said one-shot device and producing said continuous-current control signal, a pulse generator producing a second and separate direct-current pulse control signal, the repetition rate of the pulse signal being below the lowest frequency of the source, a comparison amplifier connected to said rectifier and filter means and to said pulse generator for comparing the values of said first and second control signals and producing a third control signal whose value is a function of the instantaneous difference between the values of said first and second control signals, and circuit means coupling said third control signal to said electrical means, said electrical means being under the control of said third signal.

4. A sweep oscillator system comprising a source of alternating current signals, electrical means for varying the frequency of the signals delivered by the source, a limiter coupled to said source, a discriminator coupled to said limiter and arranged to produce a first continuous-current control signal whose value at each instant is in a proportion to the instantaneous frequency of the signal being delivered by said source, a generator producing a second and separate control signal comprising a series of successive pulses, a comparison amplifier connected to said discriminator and to said generator for comparing the instantaneous values of said first continuous-current and second control signals and producing a third continuous-current control signal whose value at each instant is a function of the instantaneous difference between the values of said first and second signals, and circuit means coupling said third control signal to said electrical means, said electrical means being under the control of said third signal.

5. A sweep-frequency signal generating system for producing a sweep signal recurrently varying in frequency in accordance with a predetermined pattern controlled by a saw-tooth generator, said sweep-frequency system comprising a variable-frequency oscillator including electrical means for varying the frequency of the signals delivered by the oscillator, a limiter coupled to said oscillator for limiting the amplitude of signals delivered by said oscillator, a discriminator coupled to said limiter and arranged to produce a first direct-current control signal whose value is a direct and substantially linear function of the frequency of the signal being delivered by said oscillator, a saw-tooth generator producing a second and separate unidirectional pulsating control signal, the frequency of said sawtooth generator being below the lowest frequency of said variable frequency oscillator, and a comparison amplifier coupled to said discriminator and to said sawtooth generator for comparing the values of said first direct-current and second unidirectional control signals and producing a third direct-current control signal whose value is proportional to the instantaneous difference between the values of said first and second signals, said electrical means being connected to and under the control of said third signal whereby the frequency of said sweep signal is controlled by the magnitude of the unidirectional control signal from said saw-tooth generator and the sweep in frequency recurs with each pulsation of the unidirectional control signal from the saw-tooth generator.

6. A sweep generator including a first source of potential a second source of potential of opposite polarity, a return circuit common to both said first and second source, a capacitor, first, second, third, and fourth vacuum tubes each having a cathode, anode and control grid, a first resistor connected between said return circuit and the cathode of said first tube, a capacitor connected between the cathode of said first tube and the control grid of said second tube, a second resistor connected between the control grid of said second tube and said first source, circuit means coupling the anode of the second tube with the control grids of the first and third tubes, at least one gaseous discharge tube connected between the anode of the third tube and the control grid of the fourth tube, third and fourth resistors connected respectively between the anode of the third and fourth tubes and the said second potential source, and at least one gaseous discharge device and a current limiting element connected in series between the anode of the fourth tube and the control grid of the second tube.

7. An electrically controllable, oscillator comprising a vacuum tube, a controllable inductor having a signal winding and a control winding, capacitance means connected to said signal winding to form therewith a frequency-controlling circuit, means connecting said frequency-controlling circuit to said tube, a positive feed-back circuit coupled from said frequency controlling circuit to said tube, said positive feedback circuit including an electronic amplifying device having an input control electrode coupled to said signal winding and an output electrode coupled to the grid of said tube, and means for varying the gain of said feed-back circuit as a function of the amplitude of the signal produced by said oscillator, said gain varying means being coupled to the cathode of said vacuum tube.

8. A wide range discriminator system for producing a unidirectional signal whose magnitude is proportional to the frequency of an applied alternating current signal comprising a source of alternating current signals, wave-shaping and limiting means couple to said source and producing a series of square waves each corresponding in time to one alternation of the signals from said source, differentiating means coupled to said wave-shaping and limiting means for producing a series of short-duration impulses corresponding in time to the beginning and end of each of said square waves, rectifier means coupled to said differentiating means and arranged to transmit only those of said impulses having a predetermined polarity, a one-shot multivibrator under control of the impulses transmitted by said rectifier means and arranged to produce a series of pulses of constant duration and amplitude and each corresponding in time to one of said impulses transmitted by said rectifier means, detection means coupled to the output of said multivibrator, and a filter circuit coupled to the output of said detection means for producing a unidirectional signal whose amplitude is proportional to the rate of alternation of said alternating current signals over a wide range of frequencies.

9. A signal generating system comprising a source of alternating current signals, electrical means for varying the frequency of the signals delivered by the source, discriminator means coupled to said source and arranged to produce a first control signal whose value is a function of the frequency of the signal being delivered by said source, a sweep generator for providing variable sweep rates wherein the fly-back time is maintained as a substantially fixed percentaged of the sweep time comprising a capacitor, a first source of direct voltage, a second source of direct voltage of opposite polarity, a charging circuit for said capacitor extending between said capacitor and said first voltage source and including at least one resistance element, a discharging circuit for said capacitor extending between said capacitor and said second voltage source and including at least one gaseous discharge device, and a vacuum tube under the control of said charging circuit, the igniting of said gaseous discharge device being under the control of said vacuum tube, said sweep generator producing a second and separate control signal, means for comparing the values of said first and second control signals and producing a third control signal whose value is a function of the difference between the values of said first and second signals, and circuit means coupling said third control signal to said electrical means, said electrical means being under the control of said third signal.

10. A signal generating system comprising an electrically-controllable oscillator comprising a first vacuum tube, a controllable inductor having a signal winding and a control winding, capacitance means connected to said signal winding to form therewith a frequency-controlling circuit, means connecting said frequency-controlling circuit to said tube, a positive feed-back circuit coupled to said tube, and means for varying the gain of said feedback circuit as a function of the amplitude of the signal produced by said oscillator, discriminator means coupled to said source and arranged to produce a first control signal whose value is a function of the frequency being delivered by said oscillator, means producing a second and separate control signal, means for comparing the values of said first and second control signals and producing a third control signal whose value is a function of the difference between the values of said first and second signals, circuit means coupling said third control signal to said control winding.

11. A signal generating system comprising an electrically-controllable oscillator comprising a first vacuum tube, a controllable inductor having a signal winding and a control winding, capacitance means connected to said signal winding to form therewith a frequency-controlling circuit, means connecting said frequency-controlling circuit to said tube, a positive feed-back circuit coupled to said tube, and means for varying the gain of said feedback circuit as a function of the amplitude of the signal produced by said oscillator, discriminator mean coupled to said source and arranged to produce a first control signal whose value is a function of the frequency being delivered by said oscillator, a sweep generator for providing variable sweep rates wherein the fly-back time is maintained as a substantially fixed percentage of the sweep time comprising a capacitor, a first source of direct voltage, a second source of direct voltage of opposite polarity, a charging circuit for said capacitor extending between said capacitor and said first voltage source and including at least one resistance element, a discharging circuit for said capacitor extending between said capacitor and said second voltage source and including at least one gaseous discharge device, and a vacuum tube under the control of said charging circuit, the igniting of said gaseous discharge device being under the control of said vacuum tube, said sweep generator producing a second and separate control signal, means for comparing the values of said first and second control signals and producing a third control signal whose value is a function of the difference between the values of said first and second signals, circuit means coupling said third control signal to said control winding.

12. A signal generating system comprising a source of alternating current signals, electrical means for varying the frequency of the signals delivered by the source, a source of pulse signals coupled to said alternating-current source and providing pulse signals corresponding in frequency to the frequency of said alternating-current source, differentiating means coupled to said source of pulse signals for producing a series of short duration impulses having a recurrent rate proportional to the recurrent rate of said pulse signals, signal-responsive one-shot pulse generating means under the control of said impulses and generating constant-duration, constant-amplitude pulses having a recurrent rate proportional to the recurrent rate of said impulses, detection means coupled to the output of said pulse-generating means, and filter means connected to the output of said detection means to produce a first control signal whose value is a function of the frequency of the signal being delivered by said source, means producing a second and separate control signal, means for comparing the values of said first and second control signals and producing a third control signal whose value is a function of the difference between the values of said first and second signals, and circuit means coupling said third control signal to said electrical means, said electrical means being under the control of said third signal.

13. A signal generating system comprising a source of alternating current signals, electrical means for varying the frequency of the signals delivered by the source, a source of pulse signals coupled to said alternating-current source and providing pulse signals corresponding in frequency to the frequency of said alternating-current source, differentiating means coupled to said source of pulse signals for producing a series of short duration impulses having a recurrent rate proportional to the recurrent rate of said pulse signals, signal-responsive one-shot pulse generating means under the control of said impulses and generating constant-duration, constant-amplitude pulses having a recurrent rate proportional to the recurrent rate of said impulses, detection means coupled to the output of said pulse-generating means, and filter means connected to the output of said detection means to produce a first control signal whose value is a function of the frequency of the signal being delivered by said source, a sweep generator for providing variable sweep rates wherein the fly-back time is maintained as a substantially fixed percentage of the sweep time comprising a capacitor, a first source of direct voltage, a second source of direct voltage of opposite polarity, a charging circuit for said capacitor extending between said capacitor and said first voltage source and including at least one resistance element, a discharging circuit for said capacitor extending between said capacitor and said second voltage source and including at least one gaseous discharge device, and a vacuum tube under the control of said charging circuit, the igniting of said gaseous discharge device being under the control of said vacuum tube, said sweep generator producing a second and separate control signal, means for comparing the values of said first and second control signals and producing a third control signal whose value is a function of the difference between the values of said first and second signals, and circuit means coupling said third control signal to said electrical means, said electrical means being under the control of said third signal.

14. A signal generating system for producing a sweep signal recurrently varying in frequency in accordance with a predetermined pattern comprising a variable-frequency oscillator including electrical means for varying the frequency of the signals delivered by the oscillator, a limiter coupled to said oscillator for limiting the amplitude of signals delivered by said oscillator, a discriminator including wave-shaping and limiting means coupled to said limiter and producing a series of square waves each corresponding in time to one alternation of the signals from said source, differentiating means coupled to said wave-shaping and limiting means for producing a series of short-duration impulses corresponding in time to the beginning and end of each of said square waves, rectifier means coupled to said differentiating means and arranged to transmit only those of said impulses having a predetermined polarity, a one-shot multivibrator under control of the impulses transmitted by said rectifier means and arranged to produce a series of pulses of constant duration and amplitude and each corresponding in time to one of said impulses transmitted by said rectifier means, detection means coupled to the output of said multivibrator, and a filter circuit coupled to the output of said detection means for producing a first unidirectional signal whose amplitude is proportional to the rate of alternation of the said signals from said oscillator over a wide range of frequencies, a sawtooth generator producing a second and separate unidirectional pulsating control signal, and a comparison amplifier coupled to said discriminator and to said sawtooth generator for comparing the values of said first and second control signals and producing a third D.-C. control signal whose value is proportional to the instantaneous difference between the values of said first and second signals, said electrical means being connected to and under the control of said third signal.

15. A sweep generator for providing variable sweep rates wherein the fly-back time is maintained as a substantially fixed percentage of the sweep time comprising a capacitor, a first source of direct voltage having first and second supply connections, a second source of direct voltage having a third supply connection of opposite polarity to said first connection and having its other connection in common with said first source, a charging circuit for said capacitor extending between a first terminal of said capacitor and said first supply connection and including at least one resistance element, said charging circuit being completed from the second terminal of said capacitor to said second supply connection, a discharging circuit for said capacitor extending between said first terminal of said capacitor and said second supply connection and including a first gaseous discharge device and a second resistance element in series therewith, said discharging circuit being completed from said second terminal of the capacitor to said return circuit, a first vacuum tube having a control electrode coupled to and responsive to the potential of the first terminal of said capacitor, first resistance means connecting the anode of said first tube to said third terminal, a second vacuum tube having a control electrode coupled to the anode of said first tube and under the control of said first tube, second resistance means connecting the anode of said second tube to said third terminal, a second gaseous discharge device having one side coupled to the anode of said second tube and under the control of said second tube, and a third vacuum tube having a control electrode coupled to the other side of said second gaseous discharge device and under the control of said second gaseous discharge device, said third tube having an anode connected to said discharge circuit intermediate said second resistance element and said first gaseous discharge device and arranged to control the igniting of said first gaseous discharge device.

16. A sweep generator providing variable sweep rates wherein the "fly-back" times is maintained as a substantially fixed percentage of the sweep time comprising a plurality of capacitors, a first source of direct voltage having a first supply connection and a common supply connection, a second source of direct voltage having said common supply connection and a second supply connection of polarity opposite to said first supply connection, a first electronic valve having an output electrode and a control electrode, first resistance means connecting said output electrode to said second supply connection, second resistance means and switch means having a plurality of positions, said switch means in each of said positions connecting a respective one of said capacitors in serial relation with said second resistance means between said control electrode and said common supply connection, third resistance means connected from said control electrode to said first supply connection, a second electronic valve having a second output electrode, a second control electrode, and another electrode, fourth resistance means connecting said second output electrode to said second supply connection, a gas lamp and fifth resistance means connected in serial relation between said second output electrode and said first control electrode, sixth resistance means connecting said other electrode of said second electronic valve to said first supply connection, and circuit means connecting said second control electrode to the first output electrode, said second electronic valve controlling the extinguishing and igniting of said gas lamp, and the operation of said second electronic valve being under the control of said circuit means, said third resistance means having a resistance value much greater than said second resistance means, and said fifth resistance means having a resistance value much greater than said second and fourth resistance means, whereby the ratio of sweep time to "fly-back"

time remains substantially constant irrespective of which capacitor is switched into the circuit.

References Cited in the file of this patent

UNITED STATES PATENTS

| | | |
|---|---|---|
| 2,291,715 | Hepp | Aug. 4, 1942 |
| 2,302,893 | Roberts | Nov. 24, 1942 |
| 2,343,539 | Edson | Mar. 7, 1944 |
| 2,399,135 | Miller et al. | Apr. 23, 1946 |
| 2,403,984 | Koenig | July 16, 1946 |
| 2,406,125 | Ziegler et al. | Aug. 20, 1946 |
| 2,408,078 | Labin et al. | Sept. 24, 1946 |
| 2,424,905 | Scheldorf | July 29, 1947 |
| 2,428,617 | Dickinson | Oct. 7, 1947 |
| 2,441,957 | DeRosa | May 25, 1948 |
| 2,467,777 | Rajchman et al. | Apr. 19, 1949 |
| 2,474,354 | Guanella | June 28, 1949 |
| 2,530,081 | Ross | Nov. 14, 1950 |
| 2,557,038 | Ross | June 12, 1951 |
| 2,589,387 | Hugenholtz | Mar. 18, 1952 |
| 2,627,024 | Bell | Jan. 27, 1953 |
| 2,631,239 | Lower | Mar. 10, 1953 |
| 2,632,810 | Nyman | Mar. 24, 1953 |
| 2,652,488 | Smeltzer | Sept. 15, 1953 |
| 2,681,414 | Strandberg | June 15, 1954 |
| 2,699,503 | Lyons et al. | Jan. 11, 1955 |
| 2,750,505 | Hickin | June 12, 1956 |
| 2,774,872 | Howson | Dec. 18, 1956 |

OTHER REFERENCES

Article: "A New Sweep Frequency Signal Generator," by Edmond R. Ariesohn.